United States Patent [19]

Hannah et al.

[11] Patent Number: 5,891,496
[45] Date of Patent: Apr. 6, 1999

[54] FAT-FREE CHOPPED AND FORMED POTATO PRODUCTS AND PROCESS

[76] Inventors: Scott C. Hannah; John C. Hannah, both of 2700 Richards Rd., Bellevue, Wash. 98005

[21] Appl. No.: 906,990

[22] Filed: Aug. 6, 1997

[51] Int. Cl.⁶ .................................................... A23L 1/217
[52] U.S. Cl. ........................... 426/102; 426/43; 426/303; 426/304; 426/512; 426/516; 426/517; 426/518; 426/519; 426/520; 426/583; 426/637
[58] Field of Search .................................... 426/102, 303, 426/304, 43, 512, 516, 518, 519, 520, 583, 637, 517

[56] References Cited

U.S. PATENT DOCUMENTS

| | | |
|---|---|---|
| 3,394,012 | 7/1968 | Kolton . |
| 3,644,129 | 2/1972 | Sloan . |
| 4,082,855 | 4/1978 | Citti et al. . |
| 4,084,008 | 4/1978 | Yueh et al. . |
| 4,380,553 | 4/1983 | Schmidt . |
| 4,389,424 | 6/1983 | Hasegawa . |
| 4,419,375 | 12/1983 | Willard et al. .......................... 426/637 |
| 4,542,030 | 9/1985 | Haury et al. . |
| 4,608,262 | 8/1986 | Galland ................................... 426/637 |
| 4,663,180 | 5/1987 | Padula ..................................... 426/637 |
| 4,772,478 | 9/1988 | Biegel et al. ............................ 426/637 |
| 4,957,761 | 9/1990 | Hale . |
| 5,194,277 | 3/1993 | Laufer . |
| 5,344,663 | 9/1994 | Jewell et al. . |
| 5,393,544 | 2/1995 | Hannah et al. . |
| 5,492,707 | 2/1996 | Chalupa et al. ......................... 426/637 |
| 5,622,741 | 4/1997 | Stubbs et al. ........................... 426/637 |

OTHER PUBLICATIONS

Mid–America Farms, "Nutritional Information," Jul. 26, 1996.
Mid–America Farms, "Product Bulletin," Feb. 13, 1996.
Pacific Valley Foods, "Project: Seasoning for Fat–Free French Fries," Feb. 14, 1995.
Smith, Ora. "Potatoes: production, storing, processing," 1977.

Primary Examiner—Helen Pratt
Attorney, Agent, or Firm—Christensen O'Connor Johnson & Kindness PLLC

[57] ABSTRACT

A process for producing a frozen fat-free chopped and formed potato product. The process entails peeling potatoes, cutting the peeled potatoes into potato pieces, and blanching the cut pieces. The cut pieces are then partially blended to produce a mixture of potato bits and paste. A hydrocolloid fat substitute, such as a cultured skim milk powder stabilized with additional hydrocolloids, is introduced to the partially blended potato mixture, preferably at a level of 2 to 5% by weight. The potato pieces and hydrocolloid fat substitute are then further blended, and are then extruded into a formed fat substituted potato product. The formed potato product is then dusted with a wheat flour, precaramelized saccharide, annatto, and seasoning powder composition. The dusted formed fat substituted potato product is then prebaked to form a crust on the product, which subsequently may be frozen and packaged for storage, transport and sale. The product may then be baked to produce a fat-free product having good organoleptic properties, a crisp crust, and exterior flavor and texture that are similar to conventional fat-containing chopped and formed potato product.

25 Claims, 1 Drawing Sheet

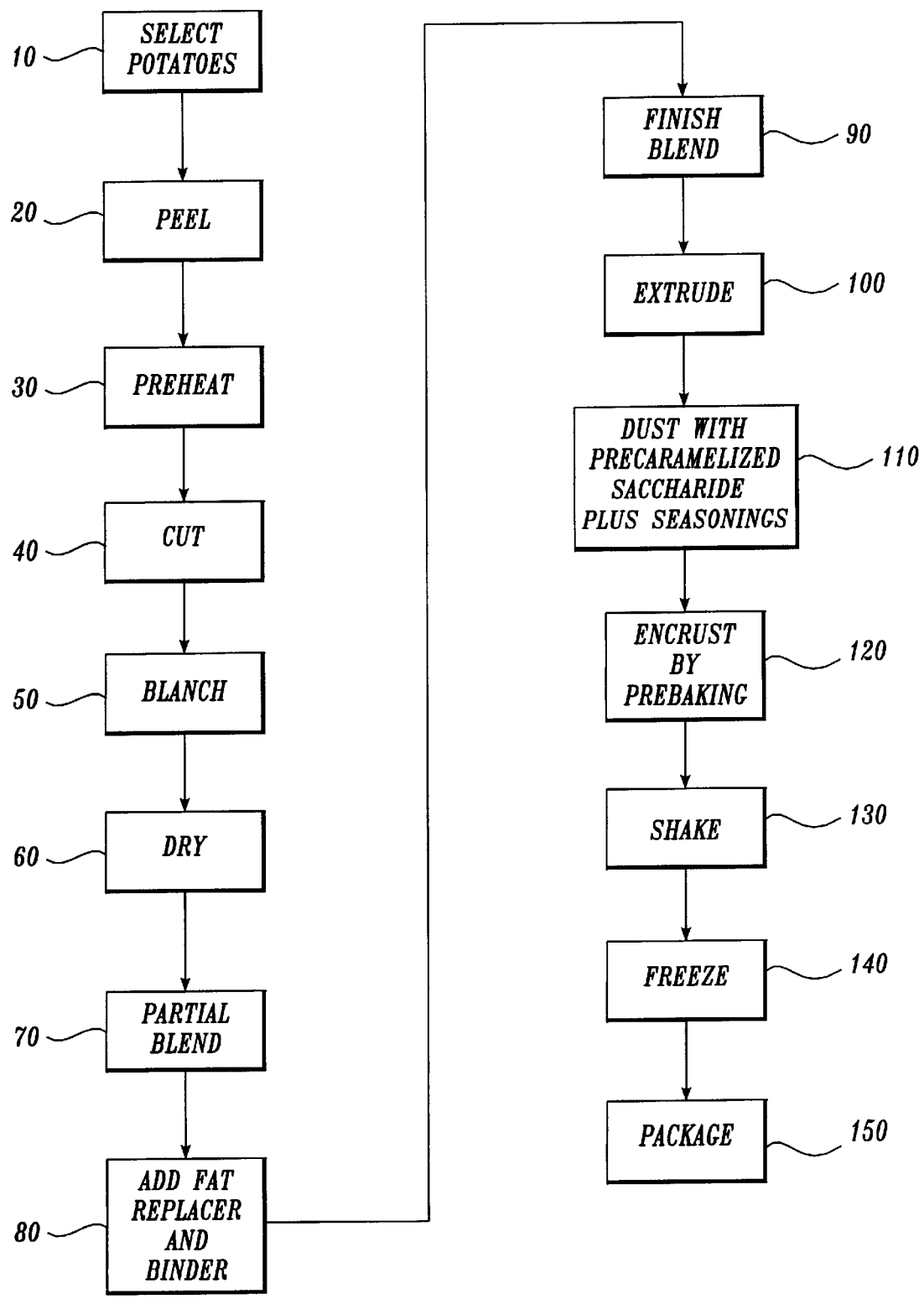

FAT-FREE CHOPPED AND FORMED POTATO PRODUCTS AND PROCESS

FIELD OF THE INVENTION

The present application relates to the processing of potatoes and, more particularly, to the processing of chopped and formed potato products.

BACKGROUND OF THE INVENTION

Potatoes that have been prepared as chopped and formed shaped products are very popular for institutional, fast food restaurant and residential consumption. Such products typically consist of small pieces of potatoes, prepared by cutting, chopping or blending, and mixed with binders, that are extruded or otherwise shaped into cylindrical "puffs" or flat patties. These products are conventionally commercially prepared by deep fat frying ("oil blanching") the formed potato shapes prior to freezing and packaging. The ultimate consumer or institution then bakes or further fries the product to finish cooking, resulting in a product that is a pleasingly crisp, golden brown on the exterior and soft on the interior. Because of the high fat content introduced to the product during frying or oil blanching, the product has favorable organoleptic properties or mouth feel. Unfortunately, these products are not necessarily healthful when frequently consumed, due to the high fat content.

In particular, conventional methods of preparing chopped, formed potato products entail peeling potatoes, shredding or chopping the potatoes into pieces, blanching and then blending the potato pieces with flavorings and binders such as potato starch or modified food starch. This blended mixture of potato pieces and binders is then extruded into the desired shape. The extruded shapes contain a sugar (sucrose) or dextrose solution, or corn syrup. The sugar, dextrose or corn syrup is added in the non-caramelized state. These coated shapes are then par-fried in a hot oil bath, typically at a temperature of approximately 360° F. Oil par-frying partially cooks the potato product to insure adhesion of the individual pieces. The sugar or corn syrup that has been applied to the potato product caramelizes and browns during oil blanching. This imparts a highly desirable coloring to the exterior of the product. More significantly, oil blanching introduces a high fat content, fatty flavor and mouthfeel that is pleasing to the palate but that is potentially unhealthy.

There thus exists a need for a formed, chopped potato product that has the appearance and mouth feel of the conventional oil blanched potato product, so that it is both visually appealing and taste appealing, yet that is more healthful due to a lower fat content.

SUMMARY OF THE INVENTION

The present invention provides a process for producing a frozen, fat-free, chopped and formed potato product. The process entails peeling potatoes, and cutting the peeled potatoes into potato pieces. A hydrocolloid fat substitute is then introduced to and mixed in with the cut potato pieces in an amount sufficient to exhibit fat-like organoleptic properties. The potato pieces and hydrocolloid fat substitute are then blended with seasoning, and the resulting blended mixture is shaped into a formed fat substituted potato product. The fat substituted formed potato products are then par-baked in the absence of fat to form a crust on the product. The product may then be frozen to produce a frozen, fat-free, formed potato product.

In a preferred embodiment of the invention, wheat flour, annatto, caramel, and other seasonings are applied to the formed fat substituted potato product, so that the exterior of the formed fat substituted potato product is imbued with a desirable golden brown exterior without undergoing oil blanching.

The formed potato product produced by the present invention has a fat-like mouthfeel (organoleptic properties) due to the presence of the hydrocolloid fat substitute, yet is fat-free. The process has a pleasing crisp crust, due to the baking, and a desirable brown exterior coloring due to the addition of wheat flour, precaramelized saccharide and annatto. A more healthful yet organoleptically and visually appealing formed chopped potato product is thus provided.

BRIEF DESCRIPTION OF THE DRAWINGS

The foregoing aspects and many of the attendant advantages of this invention will become better understood by reference to the following detailed description, when taken in conjunction with the accompanying drawing, which provides a schematic diagram of a preferred embodiment of the process of the present invention.

DETAILED DESCRIPTION OF THE PREFERRED EMBODIMENT

The present invention provides a process and method for commercially producing fat-free chopped and formed potato products. As used herein throughout, the term "fat-free" refers to a product that is devoid of added fats and oils, with the only fat content provided being that which occurs naturally in the potato flour.

The term "chopped and formed potato product" refers to a potato product that is formed from pieces of potato, which has been cut, chopped, shredded, or broken, and which is then extruded, compressed, or otherwise formed into discrete shapes such as cylinders, flat triangular patties, square patties, circular patties, and the like.

The term "hydrocolloid fat substitute" refers to a natural hydrophilic plant polysaccharide or derivative that swells to produce a viscous dispersion or solution, and which in the present invention is added to the chopped potato pieces in addition to or in lieu of conventional binders. The term "hydrocolloid fat substitute" suitably includes: the cultured skim milk powder stabilized with additional hydrocolloids that is available from Mid-America Farms under the trademark YOGURTESSE® (a registered trademark of Yogurtesse, Inc.); powdered oat bran, available commercially under the trademarks OAT TRIM and BETA TRIM from Rhône-Poulenc; and certain gums such as locust bean gum and carrageenan. The term "hydrocolloid fat substitute" excludes substances conventionally added to formed potatoes as binders, such as potato starch, modified food starch and xanthan gum.

The term "precaramelized saccharide" includes dextrose, sucrose (sugar), corn syrup or other food sugar that has been heated or oxidized to induce a brown coloring thereto prior to addition to the formed potato product of the present invention.

The present invention is best understood with reference to the enclosed drawing, which provides a schematic flow diagram of a preferred embodiment of the present invention. The process begins with selecting potatoes, as indicated by block 10 in the drawing, which have a high solids content. In particular, it is preferred that the potatoes have a predetermined specific gravity, preferably of greater than or equal to 1.085. Preferred choices for use in the present invention are Russett, Burbank or Shepody potatoes.

The selected potatoes are then peeled (block 20 of the drawing) using any one of several conventional methods well known to those of skill in the art, such as using knives, steam or infrared treatment. Preferably, the potatoes are peeled by exposing the potato to steam or infrared radiation to loosen the skin, and then by passing the potatoes through barrel tumblers to complete the peeling process.

The peeled potatoes are then preferably preheated (block 30 of the drawing) prior to cutting in order to reduce breakage during the cutting process. Preheating may be carried out by immersing the potatoes in water at a temperature of about 140°, for approximately ten minutes. This preheating reduces the incidence of slivered and/or feathered pieces during cutting of the potatoes. Slivered or feathered pieces are later likely to burn or char during fat-free baking of the ultimate formed chopped product, and thus are undesirable.

The potatoes are then cut (block 40 of the drawing) using conventional techniques, such as Urshel knives or water gun knives. Preferably, the potatoes are cut in planks having a thickness of approximately ⅜ to ½ inch. However, as noted previously, the potatoes can be otherwise processed to prepare "chopped" pieces, such as by shredding, chopping into small pieces, or by simply utilizing small potatoes that will be subsequently broken during blending.

The cut potato pieces are then blanched (block 50 of the drawing) to inactivate enzymes, and to remove excess sugars and starches, as in conventional processes. Blanching is preferably carried out by immersing the cut potato pieces in water that has been heated to approximately 190°–195°, for about two minutes. Alternatively, the potatoes may be blanched by exposing the cut potato pieces to live steam for approximately 90 seconds. The heating times for water or steam blanching may be adjusted, as is well known by those of ordinary skill in the art, depending on the thickness of the cut potato pieces and the load size of the products being blanched. After blanching, the blanched potatoes may need to be spray washed with water in order to help separate the blanched pieces. The blanched pieces are then blown dry, as represented by block 60 in the drawing, to remove excess water.

The cut potato pieces are then partially blended, as represented by block 70 in the enclosed drawing. Partial blending is preferably carried out with a paddle mixer, which breaks up the cut potato pieces to produce a mixture of small broken chunks and mashed potato paste, and water. This mixture provides small pieces which still have some bite resistance, but which are retained in a matrix of mashed potato paste. Over-mixing is to be avoided, because the absence of broken pieces and complete mashing does not provide a suitable bite texture.

Several alternatives to the partial blending of pre-cut planks may be utilized within the scope of the present invention. For example, pre-cut planks, whole small potatoes, and recycled potato bits, or any mixtures thereof, may be blended with a paddle mixer or other conventional mixer to reach the same desired consistency. The small recycled potato bits may be produced from the final steps of the present invention, as described subsequently, or from other potato processing lines, such as hash brown or french fry lines. Rather than using pre-cut planks, shredded potato pieces may alternately be blended.

As a further alternative, dehydrated frozen potato cubes may be blended with dehydrated granules and dehydrated potato flakes, all of which have been reconstituted with water, to provide the mixture that is to be extended or otherwise formed. However, this alternative mixture is not preferred, because the resultant product has a less desirable texture with less bite than that produced when using fresh cut potato pieces.

After partial blending, binders and hydrocolloid fat replacer and seasonings are added to the partially blended potato mixture, as indicated by block 80 of the drawing. The binders that are introduced aid in holding the cut and blended potato pieces together in the formed shape. Binders are also used in the conventional production of oil blanched chopped and formed potato products. Suitable binders for use in the present invention include modified food starch, which may be added at a level of 1 to 4% by weight of the total mixture, and most preferably at a level of 2% by weight. Alternative binders include xanthan gum and potato starch. Other agents may be added at this point of the process which further bind the potatoes and also improve the flavor of the potatoes. These include seasonings such as onion powder, salt and garlic salt. However, the majority of the seasonings and color are added to the exterior of the potato product, as will be described subsequently.

The natural fat substitute, which in the preferred embodiment of the present invention is a hydrocolloid fat replacer, is also added to the partially blended potato mixture at this point in the process (block 80 of the drawing). The preferred hydrocolloid fat replacer is YOGURTESSE® powdered cultured skim milk powder stabilized with additional hydrocolloids. This product, which is available from Mid-America Farms, consists of a cultured skim milk, that is cultivated and stabilized with additional hydrocolloids including whey protein, pectin, locust bean gum, and carrageenan, and also includes lactic acid, phosphoric acid, and natural flavor. This composition is spray dried by the manufacturer and is available as a cream-white, free-flowing powder. The YOGURTESSE® powdered fat replacer is preferably added to the partially blended potato mixture at a level of greater than zero to 10% by weight of the total potato mixture, and preferably at a level of 2 to 7% by weight, more preferably 3 to 5%, and most preferably 4% by weight.

As noted above, alternative hydrocolloid fat replacer are also believed to be useful in the present invention, including powdered oat bran, carrageenan, and locust bean gum, which would be included at the same approximate levels in place of, or in addition to, a portion of the YOGURTESSE® powder. The hydrocolloid fat replacer is added in addition to the conventional binders.

The binders, hydrocolloid fat replacer, and partially blended potato mixture are then further finish blended, as indicated by block 90 of the enclosed drawing. The addition of the hydrocolloid fat replacer and binder after partial blending, and prior to finish blending, is preferred to ensure an even distribution of the binder and hydrocolloid fat replacer throughout the blended potato mixture.

It is noted that coloring agents preferably are not added to the mixture at this point in the process, as this would result in a product that more readily breaks apart later during processing, and which would look odd because conventional oil blanched formed chopped potato product includes a brown coloring only on the exterior of the product, and not throughout the interior.

The blended potato mixture is then conventionally shaped into desired formed shapes, such as by extrusion, as indicated by block 100 in the drawing. A suitable extrusion machine is a drum or piston-type extruder. The formed extruded shape may preferably be a cylindrical "puff", such as a puff having an diameter of approximately ¾ to 1 inch, and a length of 1 to 1¼ inch. Other shapes and sizes are within the scope of the present invention, including formed patties of various shapes.

Extrusion produces a fat substituted formed potato product that is held together by the internal binders contained therein. These fat substituted formed product pieces are then "dusted" or externally coated on all sides and edges with coloring and seasoning amendments, as indicated by block 110 in the drawing. Commercially, the formed fat substituted potato product pieces are fed on a conveyor into a breading and/or blower spice applicator machine, such as model number K 6686, KPI-Model SA80 to apply a seasoning/coloring dusting powder composition. The seasoning and coloring dusting powder composition preferably includes wheat flour, precaramelized saccharide, such as caramelized sucrose, dextrose or corn syrup solids and annatto. One suitable type of precaramelized saccharide is a caramelized sucrose, corn syrup solid available under the trade name FROZE DEXT-24. The precaramelized corn syrup solids and aniatto are included at a level of approximately 1% of the seasoning/coloring dusting powder composition. The addition of this wheat flour, precaramelized saccharide and annatto provides the entire exterior surface, including sides and ends, of the formed potato product with the same golden brown coloring that would conventionally be obtained by oil blanching chopped and formed potato shapes that have been dipped in a sugar or corn syrup drag, yet avoids the fat content of oil blanching.

The coloring/seasoning dusting powder composition optionally, but preferably, also includes seasoning amendments. The wheat flour provides some coloring of the dusting composition, but mainly provides a carrier base for the caramel, annatto and seasoning. One suitable makeup of the flavoring amendments includes wheat flour (77%), dehydrated onion powder (10%), dehydrated garlic powder (4%), salt (4%), pepper (2.5%), paprika powder (1.5%), powdered caramel and powdered annatto (1%). However, it will be readily apparent to those of skill in the art that the relative composition of precaramelized saccharide and annatto to seasoning, and the particular seasoning agents utilized, may be omitted, substituted or varied as desired. Other suitable seasoning agents include Worcestershire sauce powder, chili powder, chicken broth powder and white or black pepper, by way of nonlimiting examples.

The formed fat substituted potato product is tumbled in the breading and/or blower spice applicator machine, with the wheat flour/coloring/seasoning dusting powder composition to evenly coat the exterior surfaces with the powder composition.

The prebaked, encrusted product is then preferably conveyorized through a shaker, indicated at block 120 in the drawing, to remove excess bits of potato and powder that may be adhered to the formed potato product to prevent later burning and blackening of these bits during final baking. The bits removed by the shaker may be recycled into the partial blending mixture.

The coated formed potato products are then prebaked in the absence of fat to "encrust" the product, as indicated by block 130 of the drawing. Prebaking forms an external crisp skin on the potato products, which not only introduces a desirable crisp texture to the exterior of the product, but also adheres the individual potato bits in the product together to further prevent the product from breaking or crumbling. Prebaking additionally helps to retain the coloring and seasoning dusting powder composition on the exterior, by melting the precaramelized saccharide and annatto and thereby bonding and fusing the coloring and seasoning ingredients to the formed potato product. The coloring and seasoning composition ingredients are blended together by this process, and the product is imparted with a favorable crisp mouthfeel, flavor and coloring. Suitable prebaking conditions are baking in a commercial fired belt oven or drier for a time period of approximately one minute at a temperature of 400° F. Commercial ovens can process 3,000 to 5,000 lbs. of formed potato product per hour in this fashion.

The prebaked, formed potato product is then flash frozen. Suitable commercial freezers include linear or spiral blast freezers. The freezing step is indicated by block 140 in the drawing.

The flash frozen potato product is then packaged, as indicated by block 150 of the drawing, for subsequent fat-free cooking. This finished frozen product is fat-free. No fat has been added to the product, and the only fat contained in the product is that naturally occurring in the potato flour. The frozen product is packaged in containers, such as polyethylene bags, that are marked with instructions for subsequent fat-free baking. The bag will thus contain instructions for baking the product in a pre-heated conventional oven, such as at a temperature of 375° for 20–25 minutes. The frozen formed product is placed in a single layer on a cookie sheet or a tin, Teflon® coated preferred to negate the need for an oil spray or wipe. This provides a product without any addition of fats to produce a fat-free finished product. The addition of a very light oil spray or wipe to the tray or pan on which the frozen product is baked produces a substantially fat-free finished baked product. However, the amount of fat absorbed for a normal spray or wipe is less than ½ of 1%, thereby retaining the nature of "fat-free" suitable for F.D.A. labeling. Alternative conventional cooking practices, such as the use of microwave oven, may also be utilized, but is less desirable due to a loss of crispness.

The finished baked product is fat-free. The product has a good exterior color, crisp crust and fat-like mouthfeel, very similar to that of a conventional oil-blanched product, but is considerably more healthful. The seasonings are contained mainly on the exterior crust of the product. The product is resistant to crumbling or breakage during storage, transport and preparation.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A process for producing a frozen fat-free chopped and formed potato product, comprising:

peeling potatoes;

cutting the peeled potatoes into potato pieces;

introducing a hydrocolloid fat substitute to the cut potato pieces at a level of greater than zero to 10% by weight;

blending the potato pieces and hydrocolloid fat substitute;

forming the blended potato pieces and hydrocolloid fat substitute into a formed fat substituted potato product;

prebaking the fat substituted formed potato product substantially in the absence of fat to form a crust on the product; and freezing the encrusted fat substituted formed potato product to produce a frozen, substantially fat-free, formed potato product.

2. The process of claim 1, wherein the introduction of the hydrocolloid fat substitute comprises the addition of a hydrocolloid fat substitute selected from the group consisting of a hydrocolloid stabilized cultured skim milk powder or powdered oat bran.

3. The process of claim 2, wherein the introduction of a hydrocolloid fat substitute comprises the addition of a hydrocolloid stabilized cultured skim milk powder.

4. The process of claim 2, wherein the introduction of the hydrocolloid fat substitute comprises the addition of the hydrocolloid fat substitute at a level of 3.0 to 5.0% by weight.

5. The process of claim 1, further comprising the application of a dusting selected from the group consisting of wheat flour, precaramelized saccharide and annatto to the exterior of the formed fat substituted potato product.

6. The process of claim 5, wherein the dusting comprises wheat flour, precaramelized saccharide and annatto and is applied prior to prebaking.

7. The process of claim 6, wherein the dusting comprises wheat flour, precaramelized saccharide and annatto and is applied as a powdered solid.

8. The process of claim 7, wherein the step of applying the dusting further comprises the application of seasonings to the exterior of the formed fat substituted potato product.

9. The process of claim 7, wherein the step of prebaking the fat substituted formed potato product results in the melt fusing of the wheat flour, powdered saccharide, annatto and seasonings.

10. The process of claim 7, wherein the step of applying the dusting is carried out using a breading and/or blower spice applicator machine.

11. The process of claim 1, further comprising introducing a binder in addition to the hydrocolloid fat substitute to the cut potato pieces, and blending the potato pieces, hydrocolloid fat substitute, and binder together.

12. The process of claim 1, further comprising preblending the cut potato pieces to produce a partially mashed cut potato piece mixture prior to the introduction of the hydrocolloid fat substitute.

13. The process of claim 1, further comprising preheating the peeled potatoes prior to cutting for a period of time sufficient to reduce shattering and slivering of the potatoes during cutting.

14. The process of claim 1, further comprising blanching the cut potato pieces in hot water prior to blending the potato pieces.

15. The process of claim 1, further comprising packaging the frozen formed potato product in a package including instructions for fat-free baking of the formed potato product.

16. The product produced by the process of claim 1.

17. A process for producing fat-free chopped and formed potato products, comprising:
   cutting peeled potatoes into potato pieces;
   introducing a hydrocolloid fat substitute to the cut potato pieces in an amount sufficient to impart fat-like organoleptic properties;
   blending the potato pieces and hydrocolloid fat substitute;
   forming the blended potato pieces and hydrocolloid fat substitute into a formed fat substituted potato product; and
   packaging the formed fat substituted potato product for subsequent baking in the absence of fat to produce a fat-free formed potato product.

18. The process of claim 17, wherein the introduction of the hydrocolloid fat substitute comprises the addition of a hydrocolloid fat substitute selected from the group consisting of a hydrocolloid stabilized cultured skim milk powder and powdered oat bran.

19. The process of claim 17, further comprising the application of a dusting selected from the group consisting of wheat flour, precaramelized saccharide and annatto to the exterior of the formed fat substituted potato product.

20. The process of claim 19, wherein the dusting comprises wheat flour, precaramelized saccharide and annatto and is applied prior to prebaking.

21. The process of claim 20, wherein the wheat flour, precaramelized saccharide and annatto and is applied as a powdered solid.

22. The process of claim 17, further comprising preblending the cut potato pieces to produce a partially mashed cut potato piece mixture prior to the introduction of the hydrocolloid fat substitute.

23. The product produced by the process of claim 17.

24. A fat-free chopped and formed potato product, comprising:
   a formed potato shape comprising blended, cut potato pieces and a hydrocolloid fat substitute at a level of greater than zero to 10% by weight; and
   a coating of wheat flour, precaramelized saccharide and annatto applied to the exterior of the formed potato shape, providing a fat-free formed potato product having substantially the exterior color and the organoleptic properties of an oil fried formed potato product.

25. The fat-free potato product of claim 24, wherein the hydrocolloid fat substitute comprises the hydrocolloid fat substitute selected from the group consisting of a hydrocolloid stabilized cultured skim milk powder and powdered oat bran.

* * * * *